United States Patent [19]

Bachmann

[11] Patent Number: 4,493,311
[45] Date of Patent: Jan. 15, 1985

[54] GUILLOTINE DAMPER

[75] Inventor: Lothar Bachmann, Auburn, Me.

[73] Assignee: Bachmann Industries, Inc., Lewiston, Me.

[21] Appl. No.: 543,336

[22] Filed: Oct. 19, 1983

[51] Int. Cl.³ .............................................. F23L 13/06
[52] U.S. Cl. ................................ 126/285 A; 251/175; 110/163
[58] Field of Search ....................... 126/285 R, 285 A; 251/74, 75, 76, 328, 327, 326; 110/163

[56] References Cited

U.S. PATENT DOCUMENTS

| | | | |
|---|---|---|---|
| 3,228,389 | 1/1966 | Lowe et al. | 126/285 A |
| 3,504,883 | 4/1970 | Beck | 251/328 |
| 3,837,617 | 9/1974 | Eminger et al. | 251/327 |
| 4,043,534 | 8/1977 | Gottshall | 126/285 A |
| 4,164,211 | 8/1979 | Onnen | 126/285 A |

FOREIGN PATENT DOCUMENTS 761334 11/1956 United Kingdom ............... 251/328

Primary Examiner—James C. Yeung

[57] ABSTRACT

A guillotine damper for use in exhaust or like duct systems which must be entered by men for servicing has its frame provided with guides extending about the flow path from one end of the opening by which the blade enters an air tight bonnet to the other end thereof and enclosed by resiliently flexible metal seals. The blade has marginal channels coextensive with the guides with the channels closely fitting the guides and compressing the sides of the seals with zero leakage attained by sealing air discharged along the channels during movement of the blade and while the damper is closed.

5 Claims, 10 Drawing Figures

U.S. Patent   Jan. 15, 1985   Sheet 1 of 6   4,493,311
Fig. 1
Fig. 2
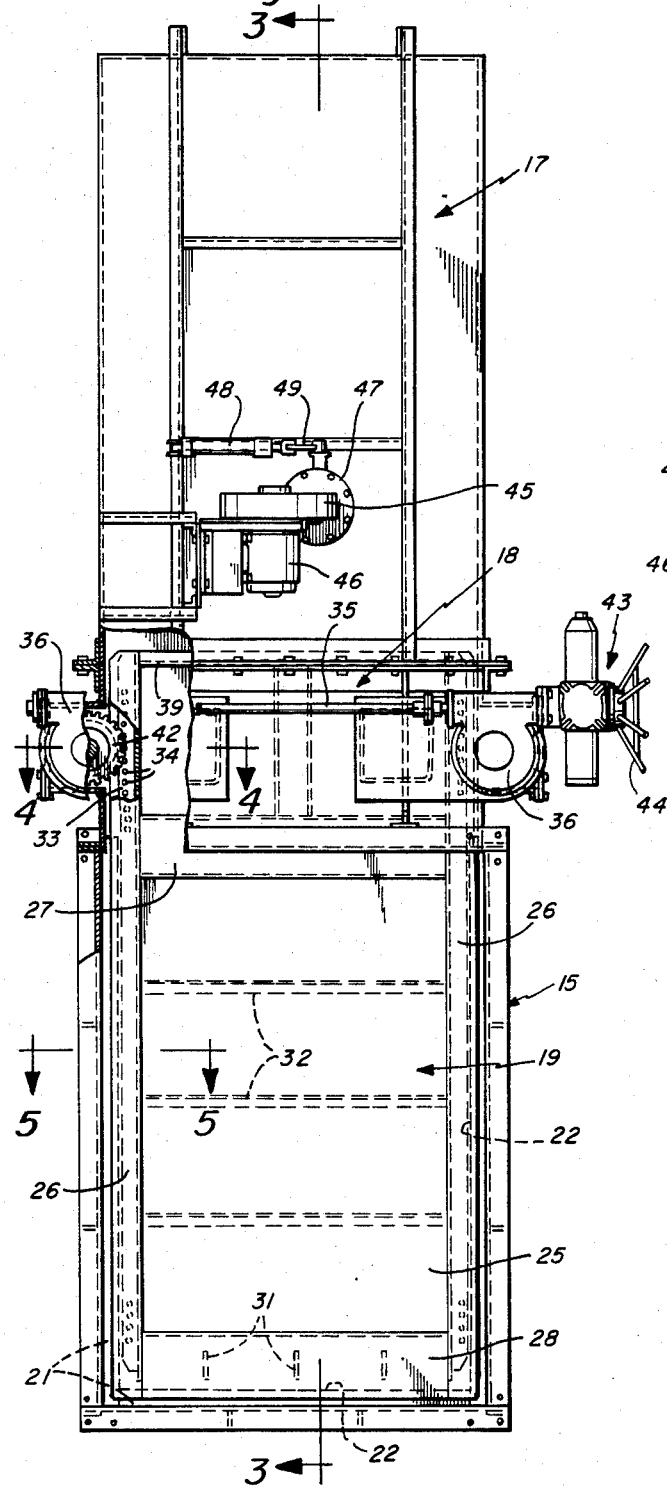
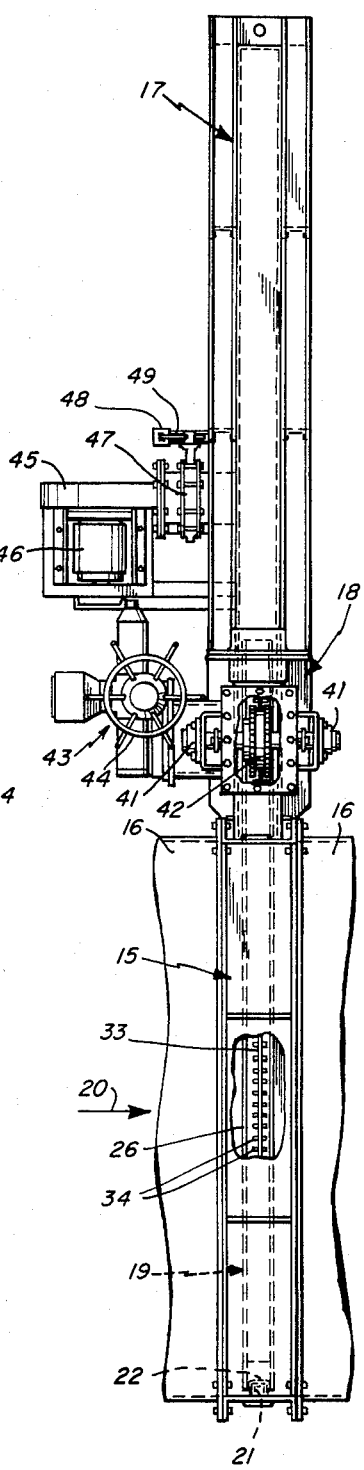

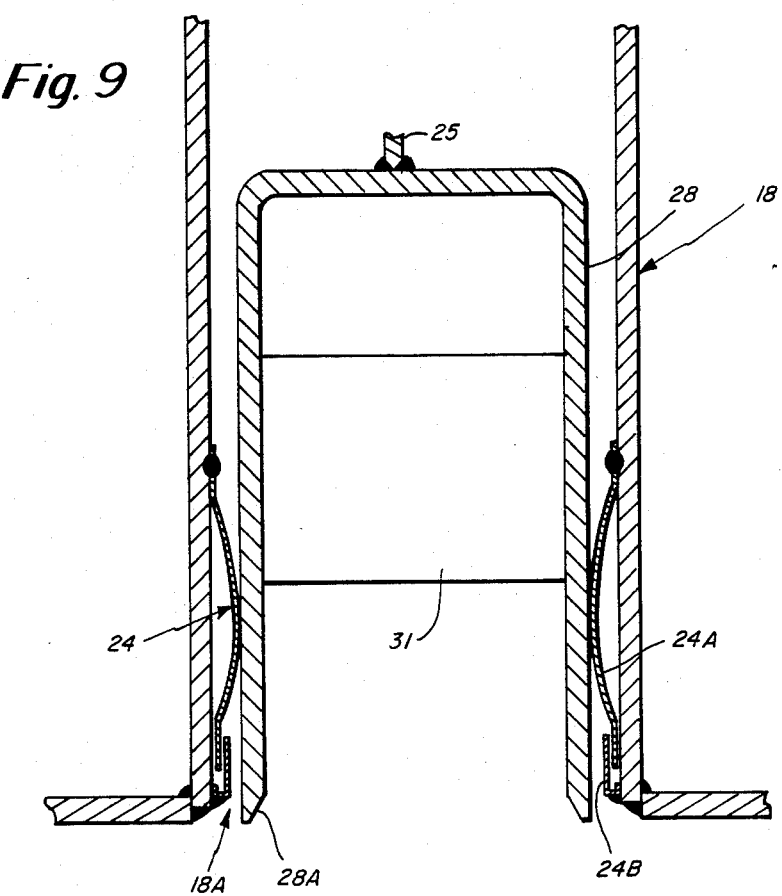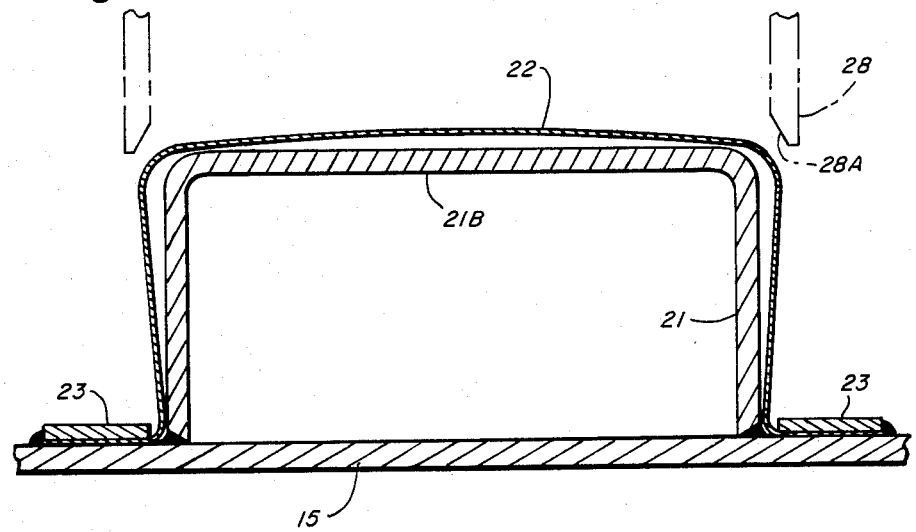

GUILLOTINE DAMPER

BACKGROUND OF THE INVENTION

Guillotine dampers are employed where it is necessary for safe entry to be made into duct systems carrying hot gases and corrosive, abrasive and dirty materials.

Such dampers have framework surrounding the flow path, a blade and a bonnet in which the blade is normally housed but movable into a duct-blocking position to establish the closed position of the damper in which margins of the blade extending outside the flow path are sealed to the frame in blade guides. Air under pressure is employed to ensure that there is no leakage of duct gases into the area to be entered.

One of the problems in ensuring that safe entry may be made into such a system is that such frame areas required for sealing tend to collect debris and the use of air to flush debris from such areas is necessary when the damper is open to ensure that such will not be so present as to cause leakage when the damper is closed.

THE PRESENT INVENTION

The general objective of the present invention is to provide a guillotine damper of the type having a frame provided with blade guides extending from one end of the blade passageway into the bonnet to the other end thereof but free of the difficulties experienced with such dampers that require that such be purged when the damper is open.

In accordance with the invention, this objective is attained by providing that the bonnet is air tight and includes a transition section and that a blade guide projects from the frame into and extends about the flow path from one end of the blade passageway into the bonnet to the other end thereof. The blade guide is enclosed by a resiliently flexible metal seal. The blade is provided with side and bottom, outwardly opening channels coextensive with the guide which are dimensioned to have such sliding engagement with the seal as to compress it as the blade is moved into its flow blocking position and with the guides serving to securely retain the blade against movement in response to pressure differentials.

The mouth of the blade passageway is provided with marginal seals which are compressed by the bottom of the frame when the damper is open and by the top thereof when the damper is closed.

Air is delivered, when the blade is in motion and when in its closed position, into the bonnet from which it flows into the blade channels and against the seals marginally of the mouth of the blade passageway.

PRIOR ART STATEMENT

No reference is known to me that employs blade guides projecting into the flow path and enclosed by resiliently flexible metal seals that are slightly compressed by open blade channels when the blade is in its closed position and while it is in motion.

BRIEF DESCRIPTION OF THE DRAWINGS

The accompanying drawings illustrate a preferred embodiment of a guillotine damper in accordance with the invention of which FIG. 1 is a front view of the damper;

FIG. 2 is a side view thereof;

FIG. 9 is a view similar to FIG. 7 but with the bottom channel of the blade now closing the mouth of the blade passageway into the bonnet; and FIG. 10 is a fragmentary section similar to FIG. 8 but illustrating somewhat schematically the engagement of the bottom channel of the blade with the seal covering the bottom section of the guide.

THE PREFERRED EMBODIMENT OF THE INVENTION

Figure 3:
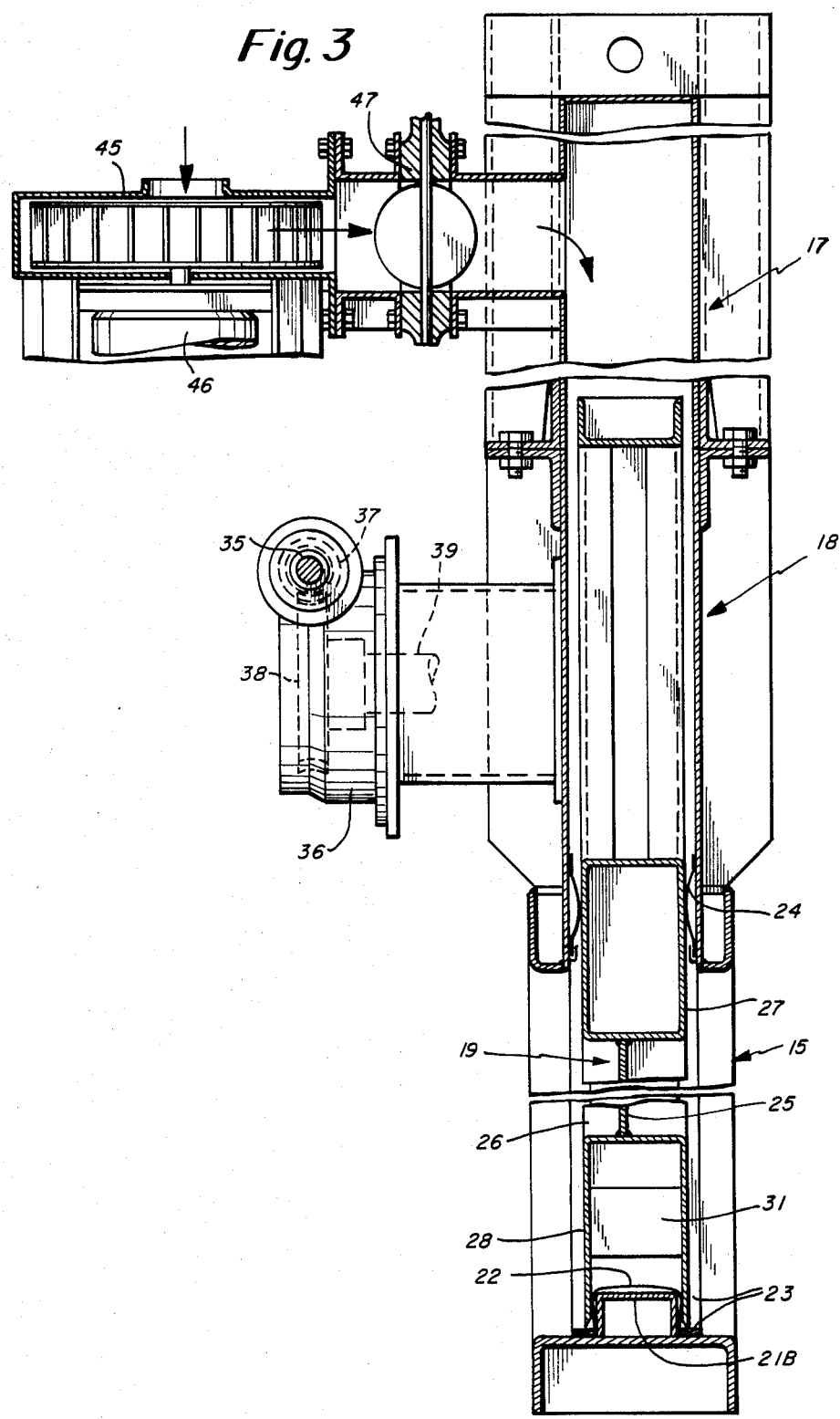
FIG. 3 is a section, on an increase in scale, taken approximately along the indicated line 3—3 of FIG. 1.

A rectangular frame, generally indicated at 15, to be incorporated in a duct 16, has an air tight bonnet 17 and an intermediate or transition section 18 which and the bonnet 17 are dimensioned to accommodate the blade 19 when the damper is open. The blade 19 is dimensioned to block the flow path through the frame 15 when the damper is closed. The direction of the flow path through the frame 15, when installed in the duct, is indicated by the arrow 20 in FIG. 2.

The inner surfaces of the frame 15 are provided with a guide, generally indicated at 21, extending continuously about the flow path from one end of the mouth 18A of the passageway through the transition section 18 to the other end thereof. The guide 21 consists of side and bottom sections 21A and 21B, respectively, with the side sections 21A extending to the remote end of the transition section 18. The edges of the guide sections are welded to the frame 15 and each section is enclosed by a resiliently flexible metal seal 22 having its margins anchored by cuffs 23 to the frame 15 and held curved about and spaced from the guide sections to permit their lateral compression.

Figure 6:
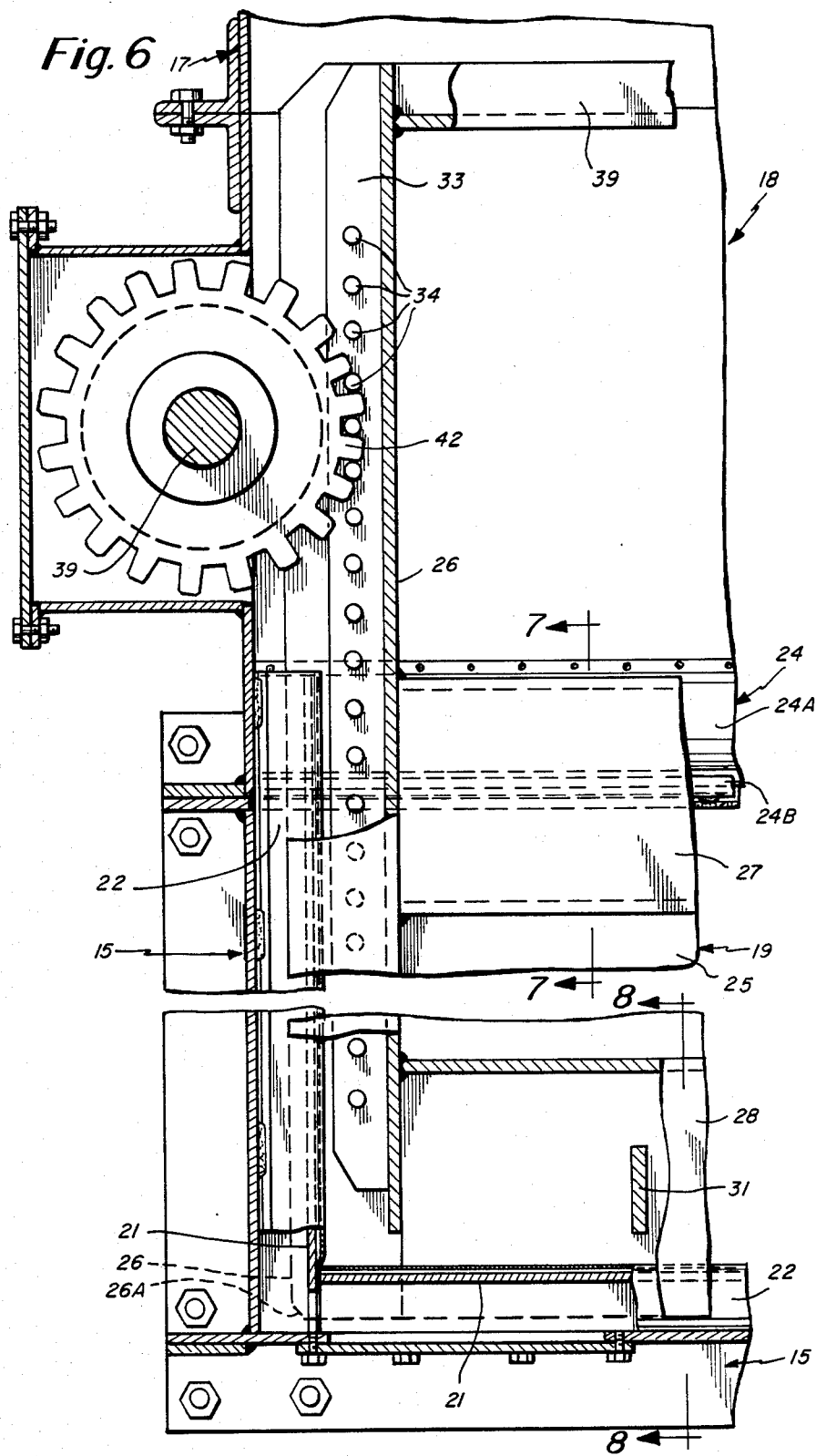
FIG. 6 is a fragmentary section showing one of the rack and pinion connections by which the blade is raised and lowered.
Figure 7:
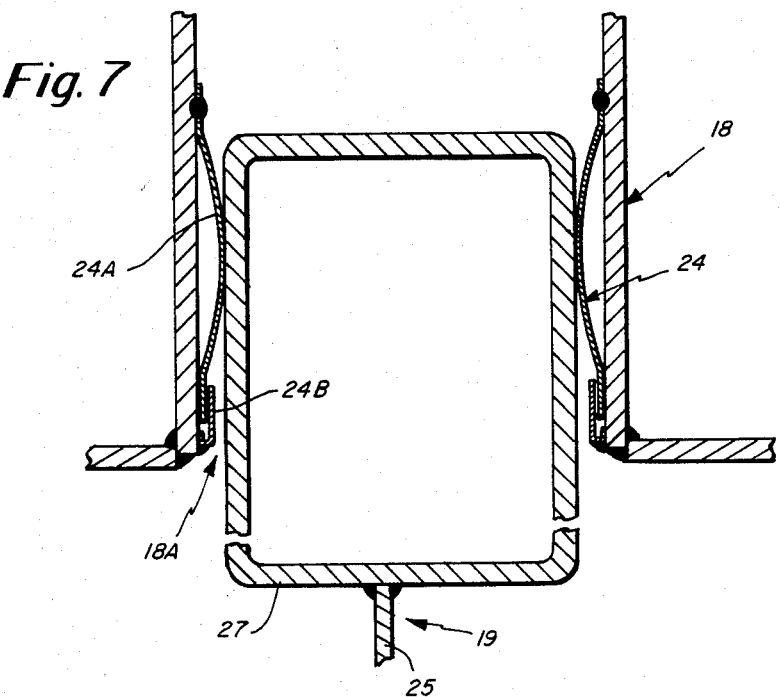
FIG. 7 is a section taken along the indicated line 7—7 of FIG. 6 but on an increase in scale.
Figure 8:
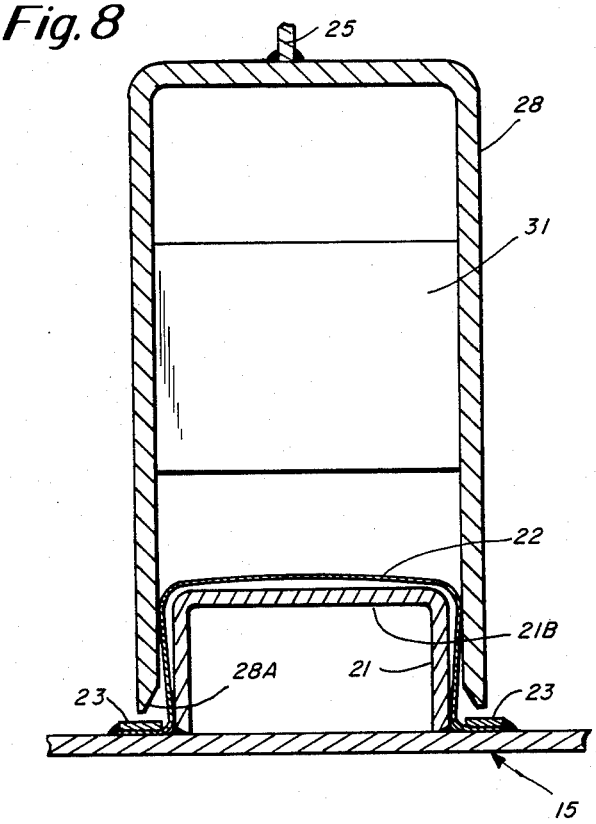
FIG. 8 is a like section taken along the indicated line 8—8 of FIG. 7 and also on an increase in scale.

Seals 24, see FIGS. 6, 7, and 9, extend the full length of both sides of the mouth 18A and each is shown as a strip of resiliently flexible steel having a central, lengthwise convex portion 24A with one margin anchored to a side of the transition section and the other margin slidably confined by a retaining strip 24B.

In practice, the seals 22 and 24 are of high quality nickel alloy the thickness of which is in the approximate range of 0.018 to 0.025 inches.

The blade 19 consists of a frame to which a sheet steel membrane 25 is welded. The frame consists of welded together side, top, and bottom sections 26, 27, and 28, respectively. The side sections 26 are of a length to extend, when the damper is closed, to the upper end of the transition section 18 where they are interconnected by a cross reinforcement 29 joined to the top section 27 by braces 30.

The side sections 26 and the bottom section 28 are U-shaped in cross section, opening in the plane of the guide 21 and are so dimensioned that, when in engagement with any portion of the seal covered guide 21, the engaged sides of the seal 22 are compressed to that minimum extent ensuring both effective sealing and long seal life. The bottom ends 26A of the side sections are beveled.

The top section 27 is hollow and oblong in cross section and is dimensioned to pass through the transition section 18 when the damper is closed, see FIG. 7. The bottom section 28 is of the same height as the top section 27 so that when the damper is open, see FIG. 9, it will be entrant of the mouth 18A and compress its seals 24. The bottom section 28 has braces 31 welded to intermediate portions of its side walls and the inner surfaces of the seal engaging edges of the bottom section 28 are outwardly tapered as at 28A.

In order that the blade 19 may be self-supporting under any pressure differentials in any damper size, and to relieve thermal stresses and to prevent binding due to buckling, the frame sections 26 and 28 are substantial being, by way of example and not of limitation, six inch channels, and are interconnected by transverse reinforcement 32, three inch channels with the membrane 25 one-quarter of an inch in thickness. Such a blade has the equivalent structural properties of a solid plate blade one and one-half inches in thickness while being torsionally sufficiently flexible to prevent blade binding. Thermal stresses are relieved into the membrane 25 allowing such a damper to work well under large temperature differentials and thermal shock.

Figure 4:
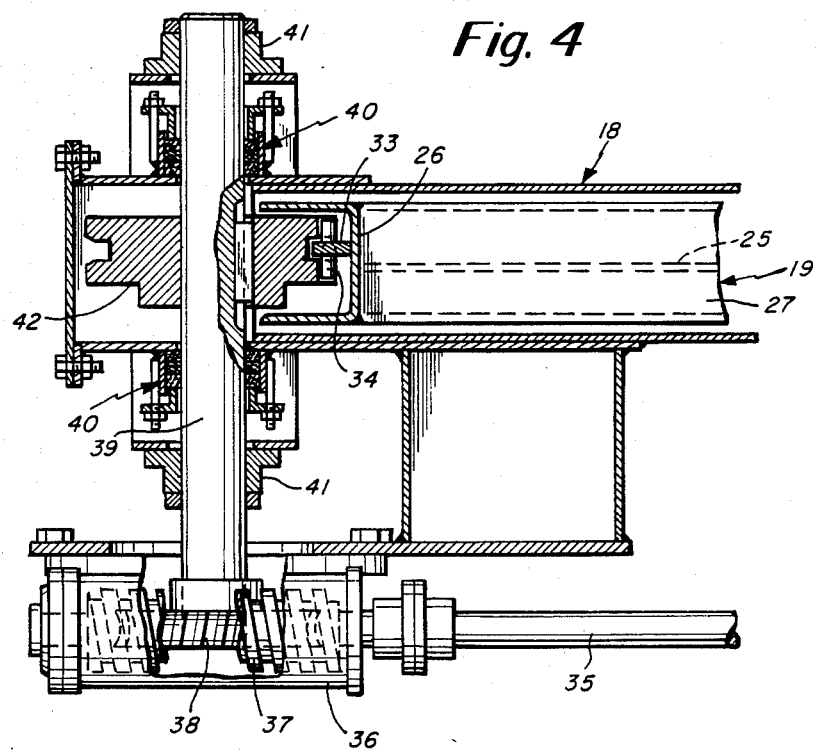
FIG. 4 is a section, on the scale of FIG. 3, taken approximately along the indicated line 4—4 of FIG. 1.
Figure 5:
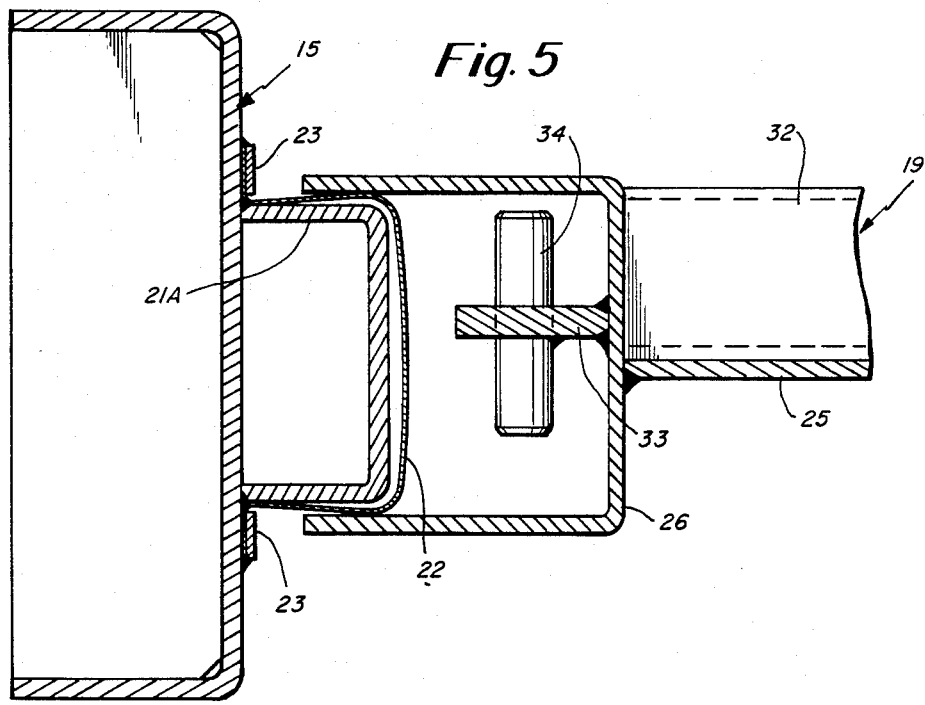
FIG. 5 is a fragmentary section, on a further increase in scale, taken approximately along the indicated line 5—5 of FIG. 1.

The side sections 26 are each provided with a lengthwise support 33 provided with a series of vertically spaced steel pins 34 extending transversely therethrough establishing a double rack, see FIGS. 4, 5, and 6. The transition section supports a blade drive consisting of a transverse shaft 35 extending into transmission housings 36, one at each side of the transition section 18, each with a worm 37 therein on the shaft 35 in mesh with a worm gear 38 on a drive shaft 39 extending through shaft seals 40 and bearings 41 mounted on the walls of the transition chamber 18. Each shaft 39 is provided with a sprocket 40 within the transition section and shown as having two spaced sets of teeth to enable them to straddle the edge of the support 33 of the appropriate rack. The shaft 35 is driven in one direction or the other by a reversible electrically operated drive, generally indicated at 43 and not detailed as it is or may be conventional and as such shown as including a handwheel 44.

While the thus established peripheral seal provides a highly effective barrier against leakage, it is commonly required that zero leakage be assured by the use of air under pressure.

To that end and in accordance with the invention, a blower 45 driven by an electric motor 46 mounted on the bonnet 17 delivers air through a damper 47 into the airtight bonnet 17 from which sealing air flows against the top section 28 and the seals 24 and lengthwise of the side sections 26 of the blade frame and into the bottom section 28 thereof as the blade 19 approaches its closed position so that air under pressure is exerted against the junctions of the seals 22 and the side walls of the side and bottom frame sections. As the blade 19 is travelling, these sections of the frame are purged by air and the flexing of the seals 22 and 24. In practice, the blower 45 is operated only when the blade 19 is moving and when it is in its closed positions. To ensure that there is no leakage from the bonnet 17 when the damper is open, the damper 47 is under the control of a double-acting pneumatic actuator 48 supported by the bonnet 17 and connected to the operating arm 49 of the damper 47.

The control system for effecting the open and closed positions of the blade 19 for controlling the blower 45 and the damper 47 is not shown as such are well known and form no part of the present invention.

I claim:

1. A guillotine damper to be incorporated in a duct system, said damper including a frame establishing a passageway through the damper, a blade, an airtight bonnet dimensioned to accommodate the blade and connected to said frame, said frame having a blade accommodating mouth opening into the bonnet, means operable to reciprocate said blade between an open damper position in which the blade is housed in the bonnet and a closed damper position in which the blade blocks the passageway through the frame, a guide attached to the frame and extending about and into the passageway therethrough from one end of the mouth to the other end thereof, said blade provided with a marginal channel coextensive with the guide and disposed and dimensioned to slide along and over corresponding portions of said guide, said frame provided with a resiliently flexible metal seal coextensive with and overlying said guide in a manner such as to be entrant of said channel and be compressed thereby into sealing engagement therewith as said damper is closed.

2. The guillotine damper of claim 1 in which said seal is a nickel alloy the thickness of which is in the approximate range of from 0.018 to 0.025 of an inch.

3. The guillotine damper of claim 1 or 2 in which the guides and channels are U-shaped with the edges of the guide welded to the frame.

4. The guillotine damper of claim 2 or 3 in which the seal overlies the guide and cuffs anchor the margins of the seal to the frame and hold the seal so curved that side portions thereof are spaced from the guide and in a position to be compressed on engagement by the channel inwardly towards each other.

5. The guillotine damper of claim 4 in which the cuffs, at least in that portion of the guide opposite the opening are in the path of and are engageable by the sides of the channel.

* * * * *